(12) United States Patent
Toscano

(10) Patent No.: US 6,345,587 B1
(45) Date of Patent: Feb. 12, 2002

(54) VISUAL PARKING GUIDE FOR A VEHICLE

(76) Inventor: Phillip Toscano, 265 Kings Highway, Clarksboro, NJ (US) 08020

( * ) Notice: Subject to any disclaimer, the term of this patent is extended or adjusted under 35 U.S.C. 154(b) by 0 days.

(21) Appl. No.: 09/323,925

(22) Filed: Jun. 2, 1999

(51) Int. Cl.⁷ .............................................. B60Q 9/00
(52) U.S. Cl. ........................................ 116/30; 116/201
(58) Field of Search ................................ 116/30, 28 R, 116/35 R, 173, 209, 215, 201, 284, 303; 33/264, 303; 280/477; 200/61.44; 340/436

(56) References Cited

U.S. PATENT DOCUMENTS

| | | | | |
|---|---|---|---|---|
| 2,221,330 A | * | 11/1940 | Schneider | 200/61.44 |
| 2,672,841 A | | 3/1954 | Nitzberg | |
| 2,753,439 A | | 7/1956 | Greenfield | |
| 2,871,814 A | | 4/1959 | Stahl | |
| 3,540,406 A | * | 11/1970 | Dexter | 116/28 R |
| 3,563,200 A | | 2/1971 | Grossman | |
| 3,643,902 A | * | 2/1972 | Gualano | 248/539 |
| 3,858,924 A | * | 1/1975 | Bores | 293/117 |
| 3,879,062 A | * | 4/1975 | Miller | 280/477 |
| 3,998,285 A | * | 12/1976 | Cooper | 280/762 |
| 4,016,653 A | * | 4/1977 | Bartlett | 33/264 |
| 4,070,645 A | * | 1/1978 | Oreluk | 340/436 |
| 4,192,526 A | * | 3/1980 | Myers | 280/477 |
| 4,313,264 A | | 2/1982 | Miller | |
| 4,755,791 A | | 7/1988 | Kuroda | |
| 4,856,200 A | * | 8/1989 | Riggs | 33/264 |
| 5,096,102 A | * | 3/1992 | Tolson | 224/513 |
| 5,113,588 A | * | 5/1992 | Walston | 33/264 |
| 5,732,927 A | * | 3/1998 | Purpura | 248/539 |
| 5,815,976 A | * | 10/1998 | Jernigan et al. | 43/21.2 |
| 6,239,926 B1 | * | 5/2001 | De Shazer | 359/841 |

\* cited by examiner

Primary Examiner—Diego Gutierrez
Assistant Examiner—R. Alexander Smith
(74) Attorney, Agent, or Firm—John H. Scarborough; Robert R. Mallinckrodt

(57) ABSTRACT

A parking guide for a vehicle made of a telescoping antenna attached to a mounting bracket wherein the antenna is extended to allow the driver to see where the front or rear of a vehicle is in relation to other objects while parking.

7 Claims, 5 Drawing Sheets

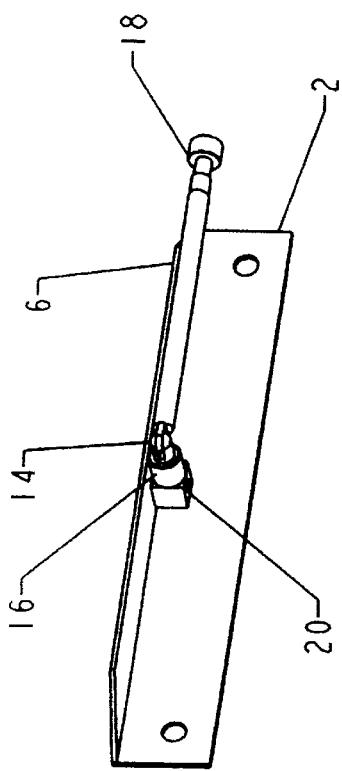
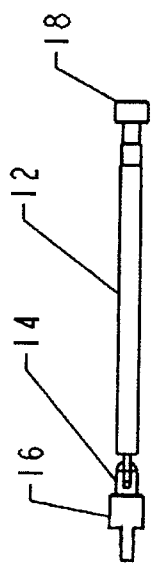
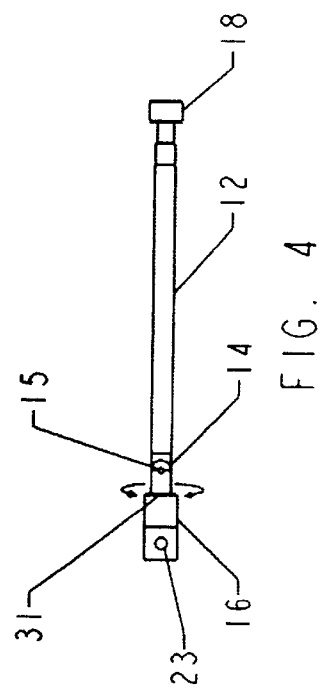

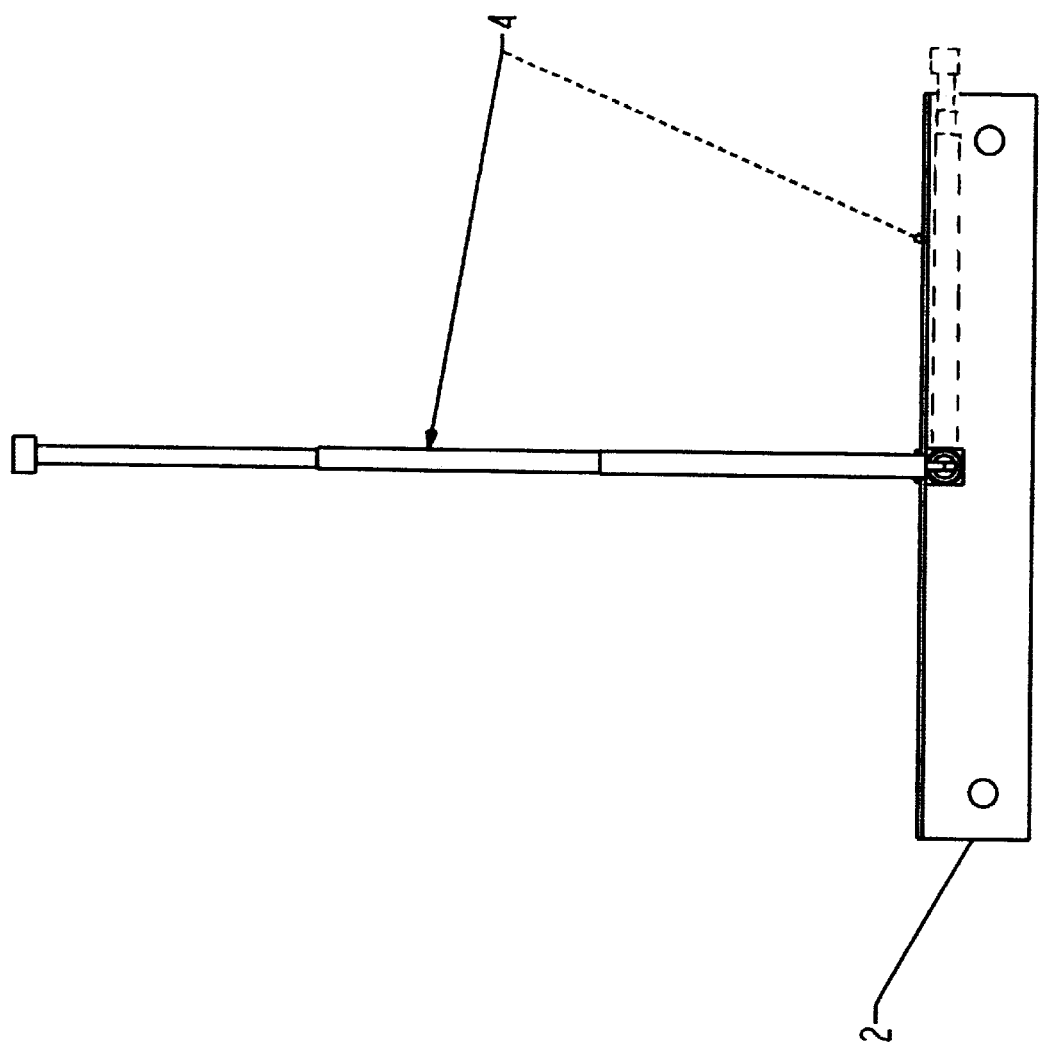

VISUAL PARKING GUIDE FOR A VEHICLE

BACKGROUND OF THE INVENTION

1. Field

This invention is in the field of visual guides to aid in the parking of vehicles.

2. State of the Art

Vehicles manufactured today are expensive; parts are expensive. Damage to seemingly insignificant parts can be costly as compared to several years ago. Many expenses are incurred by so-called "fender-bender" accidents. Even a small slip while parking a vehicle can be very costly.

To avoid this problem, there are various devices which serve as a visual aid to drivers while parking their vehicles.

Some prior art provide corner devices for visual sighting. Kuroda, U.S. Pat. No. 4,755,791, is a corner pole device that automatically expands or contracts upon detection of change of speed of the vehicle. The device is used while parking a vehicle when traveling at a low rate of speed. Bores, U.S. Pat. No. 3,858,924, is another device attached to the front corner bumper of a vehicle permitting the driver to be aware of the positions of the corners of bumpers when driving or parking a vehicle.

Other devices in the prior art are attached to and mounted on the headlight of a vehicle in order to provide for visual detection. Stahl, U.S. Pat. No. 2,871,814, Greenfield, U.S. Pat. No. 2,753,439, and Nitsberg, U.S. Pat. No. 2,672,841, are all devices which attach to and mount on a headlight of a vehicle to serves as a visual guide to the location of the fender while the driver is operating a vehicle.

Grossman, U.S. Pat. No. 3,563,200, discloses a clip attached to the edge of a rear trunk. A rod extending upward from the clip is used to facilitate visual location by the driver of the rearward position of the vehicle.

Miller, U.S. Pat. No. 4,313,264, discloses a pair of devices used in conjunction with each other to aid the sight of the driver when coupling two vehicles together.

However, none of the prior art provides a means for a visual guide which is attached directly to the front or rear of a vehicle, more particularly to a license plate holder.

OBJECTS OF THE INVENTION

The primary object of this invention is to provide the driver of a vehicle with a means to determine the location of the front or rear of a vehicle as a visual aid while the driver is parking the vehicle.

Another object of this invention is to provide a parking guide for a driver which is easy and simple to install. This invention can be attached to an existing license plate holder without any other accessories. Only a screwdriver is needed to remove the existing screws of a license plate holder to attach this parking guide.

Further, it is an object to provide a parking guide which is inexpensive. And still further, it is an object of this invention to provide a parking guide which can be used without causing damage to the vehicle.

SUMMARY OF THE INVENTION

The visual guide for parking a vehicle in this invention is a telescoping antenna which is fastened to a mounting bracket. The mounting bracket attaches to the license plate holder of a vehicle by means of the same screws which hold the license plate in place.

Whereas all previously mentioned prior art require some modification or alteration to a vehicle in order to install a visual sighting device, this invention is very easy to install. One merely needs a screwdriver to attach this visual guide to an existing license plate holder.

Likewise, the prior art is expensive to purchase and install. Kuroda, U.S. Pat. No. 4,755,791, with its complex electronics would be very expensive. However, this invention comprising a bracket made of sheet metal and a telescoping antenna is relatively inexpensive.

Corner devices and those devices which are attached to and mounted on headlights require drilling on the body of the vehicle or other modifications to a vehicle in order to be installed. Therefore, if the visual sighting device is removed, there is damage to the vehicle still remaining. The device of this invention can be removed or transferred to another vehicle without leaving damage to the vehicle itself.

Moreover, those devices which are attached to and mounted on headlights (Stahl, U.S. Pat. No. 2,871,814, Greenfield, U.S. Pat. No. 2,753,439, and Nitsberg, U.S. Pat. No. 2,672,841) would not be applicable to vehicles which are manufactured today. Most vehicles manufactured today have a bulb which is inserted into a recessed headlamp cavity that serves as a headlight.

In order to install Grossman, U.S. Pat. No. 3,563,200, a trunk lid must be compressed. This could cause damage to and break the trunk-lid-to-body seal of a vehicle which would allow leaks to the trunk during rain.

BRIEF DESCRIPTION OF THE DRAWINGS

The best mode presently contemplated for carrying out the invention in actual practice is shown in the accompanying drawings, in which:

FIG. 2 is a perspective view of the parking guide showing the telescoping antenna collapsed for storage.

FIG. 4 is a plan view of a telescoping antenna detached from the mounting bracket.

FIG. 5 is an elevation view of the telescoping antenna detached from the mounting bracket.

FIG. 6 is an elevation view of the parking guide showing the telescoping antenna in extended position in solid lines and in collapsed position in phantom.

DETAILED DESCRIPTION OF THE ILLUSTRATED EMBODIMENT

Figure 1:
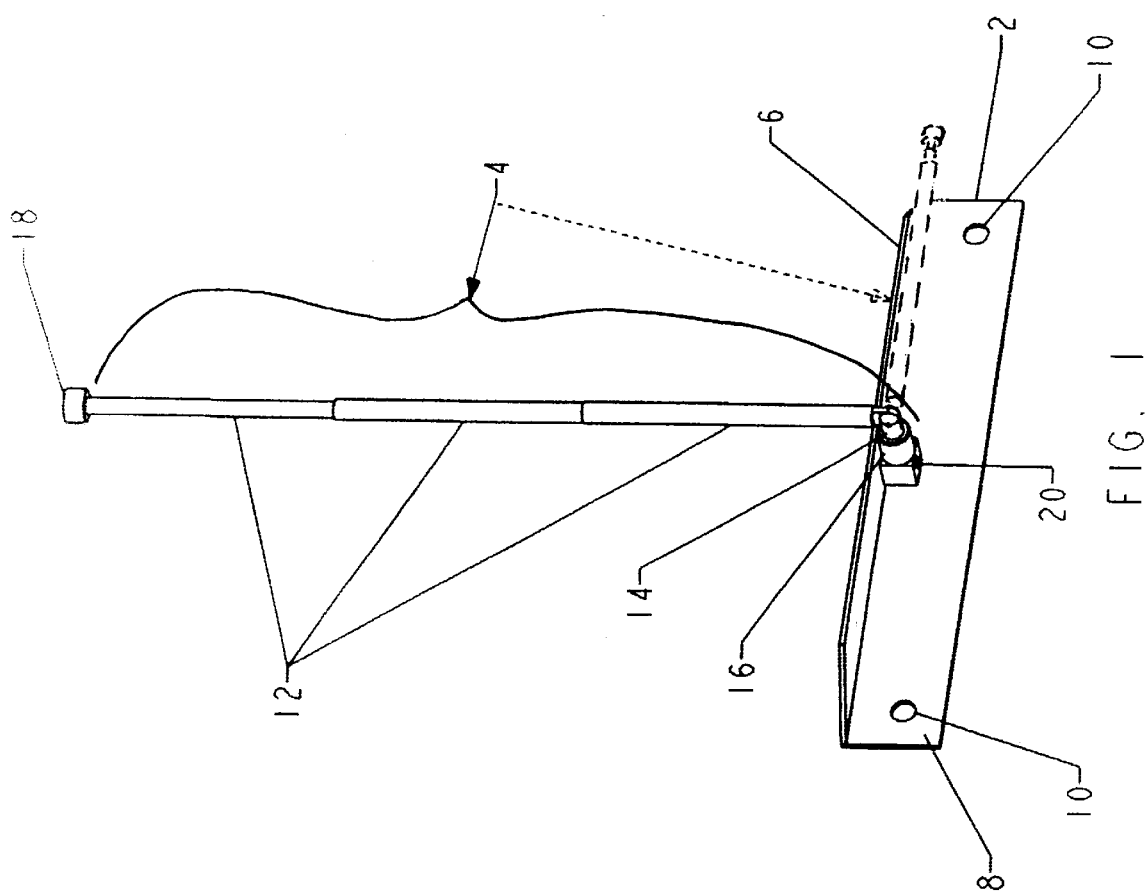
FIG. 1 is a perspective view of the invention showing a telescoping antenna attached to a mounting bracket for use as a visual parking guide, showing the telescoping antenna in extended position as solid lines and in collapsed position as phantom lines.
Figure 7:
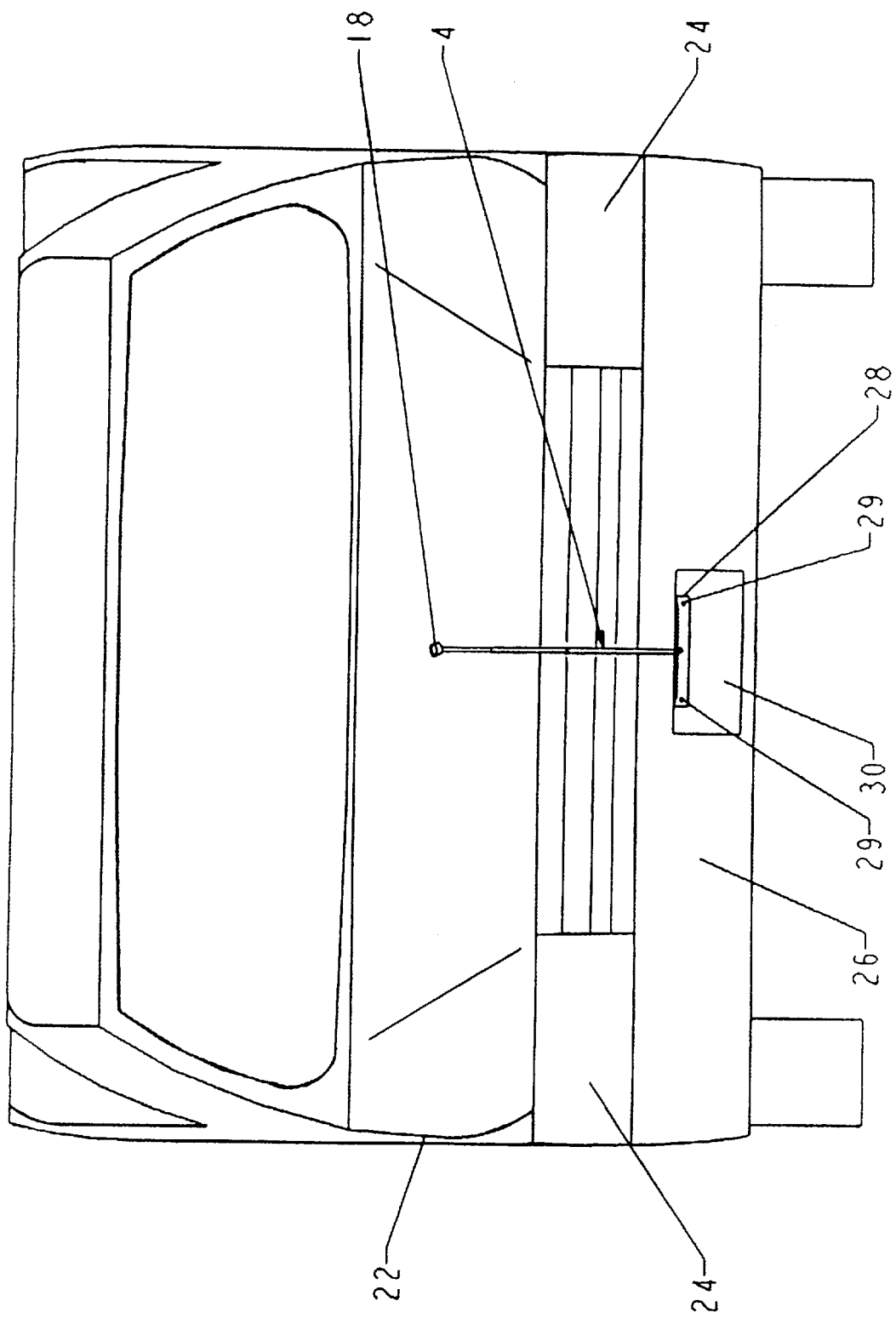
FIG. 7 is a perspective view of the visual parking guide according to a preferred embodiment, installed on a license plate holder at the front end of a vehicle.

In the illustrated embodiment, the visual parking guide is made of a mounting bracket 2 and a telescoping antenna 4. The mounting bracket 2 has a holding flange 6 which is folded at a right angle to a mounting flange 8 as shown in FIG. 1. Mounting holes 10, generally $5/16"$ in diameter to correspond to the normally provided holes in a license plate holder, are spaced appropriately for mounting the bracket to a standard license plate holder 28 which is shown in FIG. 7. The telescoping antenna 4 comprises a swivel arm 16, a pivot arm 14 extending from and mounted to swivel in swivel arm 16, and extendable telescoping rods 12 pivotally secured to pivot arm 14 by pin 15 as shown more clearly in FIGS. 4 and 5. Pivot arm 14 is rotatably attached to swivel arm 16 inside swivel arm 16, not shown, such that pivot arm 14 swivels relative to swivel arm 16 at point 31, FIG. 4, as shown by arrows. Such telescoping antenna units are currently commercially available.

Figure 3:
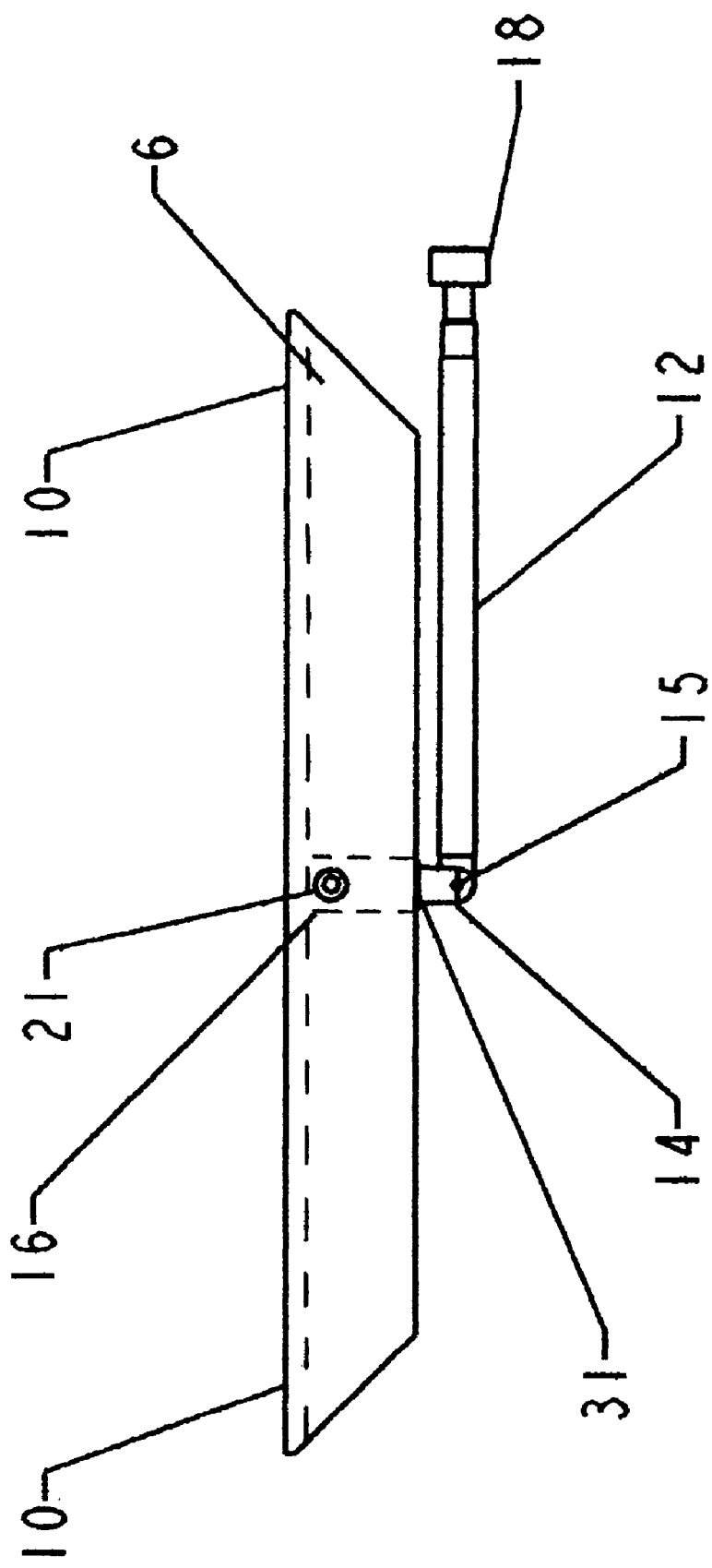
FIG. 3 is a plan view of the parking guide showing the telescoping antenna collapsed for storage.

The telescoping antenna 4 is fastened to the holding flange 6 by means of bolt 20 passing through holding flange 6 and a hole 23, FIG. 4, in the end of swivel arm 16 as shown in FIGS. 1 and 2. Rather than a bolt 20, a rivet 21, as shown in FIG. 3, or any other securing means could be used. Demarcation line 31, shown hidden in FIG. 3, indicates where pivot arm 14 meets swivel arm 16. FIG. 1 shows the extendable rods 12 extended and swivelled to a vertical orientation, as solid lines, while the telescoping antenna 4 is in use as a visual parking guide. FIG. 1 shows the extendable rods 12 collapsed and swivelled so they clear holding flange 6 in a horizontal orientation, as phantom lines, to be set up for storage when the telescoping antenna 4 is not in use. FIG. 2 also shows the extendable rods 12 collapsed and swivelled to a horizontal orientation for storage while the telescoping antenna 4 is not in use.

In order to position the telescoping antenna 4 for use as a visual guide, 1) the extendable telescoping rods 12 are pivoted to a point where the extendable rods 12 clear the holding flange 6 and are parallel to the mounting flange 8 by pivoting the extendable rods 12 in relation to the pivot arm 14, 2) the extendable rods 12 are swivelled to a point where the extendable rods 12 form substantially a right angle to the holding flange 6 and are in a substantially vertical orientation by swiveling the extendable rods 12 with pivot arm 14 in relation to the swivel arm 16, and 3) then the extendable rods 12 are extended to a point so the driver of the vehicle can see the visual cap 18 at the extended end of the extendable rods 12 over the hood of the vehicle as shown in FIGS. 1, 6, and 7.

To secure the telescoping antenna for storage, the reverse actions are executed. 1) The extendable telescoping rods 12 are collapsed, 2) the extendable rods 12 are swivelled to a point where the extendable rods 12 are parallel to both the holding flange 6 and the mounting flange 8, and 3) then, the extendable rods 12 are folded against the mounting flange 8 for storage as shown in FIGS. 2, 3, and 6.

FIG. 6 shows in solid lines the telescoping antenna 14 extended for use as a visual parking guide and in phantom lines the telescoping antenna collapsed for storage.

A preferred way of mounting the device of the invention is shown in FIG. 7. The device of the invention which includes the telescoping antenna 4 is installed on the front license plate holder 28 generally mounted on the front bumper 26 of the vehicle, by screws or bolts 29 which also secure license plate 30 to license plate holder 28 as shown in FIG. 7. The holding flange 8 is positioned between license plate 30 and license plate holder 28 so as not to obscure any of the license plate 30. Screws or bolts 29 pass through the license plate 30, through the mounting holes 10 of the mounting flange 8, and into the license plate holder 28 as shown in FIG. 7. The telescoping antenna unit 4 is shown in extended condition in use as a visual parking guide. The driver can see the visual cap 18, which may be made of a colored plastic to aid in its detection, over the hood of the vehicle and from that get a good sense of the location of the front of the vehicle, the location of which is otherwise difficult to judge, particularly during parking of the vehicle as shown in FIG. 7. FIG. 7 also shows the physical location of the parking guide in relation to the headlights 24, front bumper 26, and license plate 30.

The device of the invention can similarly be mounted on the rear license plate holder normally provided at the rear of most vehicles to allow a driver better to judge the location of the back or rear of the vehicle. Where a license plate holder only has license plate mounting screws or bolts at the bottom of the holder for attachment to the bottom of a license plate, the mounting bracket 2 can be mounted behind the bottom of the license plate with the holding flange 6 extended below the license plate and the telescoping antenna unit swivelled and pivoted to extend vertically upward therefrom.

The invention also contemplates the method for mounting and receiving a telescoping antenna as a visual parking guide.

While the present invention has been disclosed in connection with the preferred embodiment thereof, it should be understood that there may be other embodiments which fall within the spirit and scope of the invention as defined by the following claims.

I claim:

1. A method of using a parking guide as a visual aid to a driver in parking a vehicle, comprising the steps of:
    obtaining a parking guide having
        a mounting bracket,
        a telescoping antenna, said telescoping antenna having
            a swivel arm for attachment to the mounting bracket,
            a pivot arm which swivels with respect to the swivel arm,
            said telescoping antenna being formed by a plurality of extendable telescoping rods, one end of one of said rods pivotally attached to the pivot arm, whereby with the swivel arm attached to the mounting bracket the extendable telescoping rods can be swivelled and pivoted to a desired position in relation to the mounting bracket,
        means for attaching the telescoping antenna to the mounting bracket, and
        means for attaching the mounting bracket to an end of a vehicle;
    swiveling and pivoting the telescoping antenna to an upright position and extending the telescoping antenna such that it can be seen by the driver seated inside the vehicle to use the telescoping antenna as a visual guide; and
    collapsing the telescoping antenna and swiveling and pivoting the telescoping antenna against the mounting bracket for storage while the telescoping antenna is not in use as a visual guide.

2. A method of using a parking guide for use as a visual aid to the driver in parking a vehicle as defined by claim 1, wherein the means for attaching the bracket to the end of a vehicle is a means to attach the bracket to a license plate holder of the vehicle.

3. A method of using a parking guide for use as a visual aid to the driver in parking a vehicle as defined by claim 2, wherein the means to attach the bracket to a license plate holder of the vehicle is a pair of holes in the bracket through which license plate mounting screws, which normally mount a license plate to the license plate holder, can pass to also attach the bracket to the license plate holder.

4. A method of using a parking guide for use as a visual aid to the driver in parking a vehicle as defined by claim 3, wherein the bracket is attached to the front license plate holder of the vehicle to attach the parking guide to the front end of the vehicle.

5. A method of using a parking guide for use as a visual aid to the driver in parking a vehicle as defined by claim 3, wherein the bracket is attached to the rear license plate holder of the vehicle to attach the parking guide to the rear end of the vehicle.

6. A method of using a parking guide for use as a visual aid to the driver in parking a vehicle as defined by claim 1, wherein the means for attaching the telescoping antenna to the bracket is a rivet.

7. A method of using a parking guide for use as a visual aid to the driver in parking a vehicle as defined by claim 1, wherein the means for attaching the telescoping antenna to the bracket is a bolt.

* * * * *